United States Patent [19]
Miyawaki et al.

[11] Patent Number: 5,663,555
[45] Date of Patent: Sep. 2, 1997

[54] PHOTO-ELECTRIC CONVERTER WITH PARALLEL CONNECTION ELEMENTS AND DUAL SIGNAL READ OUT MEANS

[75] Inventors: Mamoru Miyawaki, Isehara; Isamu Ueno, Hadano, both of Japan

[73] Assignee: Canon Kabushiki Kaisha, Tokyo, Japan

[21] Appl. No.: 674,461

[22] Filed: Jul. 2, 1996

Related U.S. Application Data

[63] Continuation of Ser. No. 261,163, Jun. 17, 1994, abandoned.

[30] Foreign Application Priority Data

Jun. 18, 1993 [JP] Japan .................. 5-147708

[51] Int. Cl.$^6$ .................................. H01J 40/14
[52] U.S. Cl. .................. 250/208.1; 250/201.2; 250/214 LS; 354/402; 356/222
[58] Field of Search .............. 250/208.1, 208.3, 250/214 LS, 205, 201.2; 348/307, 308, 302, 362; 354/402–409, 429–434, 266; 355/81; 356/221, 222, 218

[56] References Cited

U.S. PATENT DOCUMENTS

| | | | |
|---|---|---|---|
| 3,730,063 | 5/1973 | Kobayashi et al. | 354/402 |
| 4,159,847 | 7/1979 | Dearth et al. | 250/559.17 |
| 4,701,048 | 10/1987 | Tokuda et al. | 356/222 |
| 4,819,074 | 4/1989 | Suzuki | 348/298 |
| 4,843,474 | 6/1989 | Suzuki | 348/230 |
| 4,908,709 | 3/1990 | Inuiya et al. | 348/314 |
| 4,937,604 | 6/1990 | Yoshida et al. | 354/266 |
| 4,992,653 | 2/1991 | Kawahara et al. | 250/208.1 |
| 5,122,649 | 6/1992 | Murayama et al. | 250/208.1 |
| 5,272,328 | 12/1993 | Furukawa | 250/208.1 |

FOREIGN PATENT DOCUMENTS

A0365294 4/1990 European Pat. Off. .

*Primary Examiner*—Que Le
*Attorney, Agent, or Firm*—Morgan & Finnegan, L.L.P.

[57] ABSTRACT

An image information processing apparatus comprising a parallel connection circuit for parallelly connecting a plurality of photo-electric conversion elements, a combined signal read circuit for reading out a combined signal from the plurality of parallelly connected photo-electric conversion elements, an individual signal read circuit for reading out an independent individual signal of each of the plurality of photo-electric conversion elements, a photometry circuit connected to the combined signal read circuit and a distance measurement circuit connected to the individual signal read circuit.

14 Claims, 9 Drawing Sheets

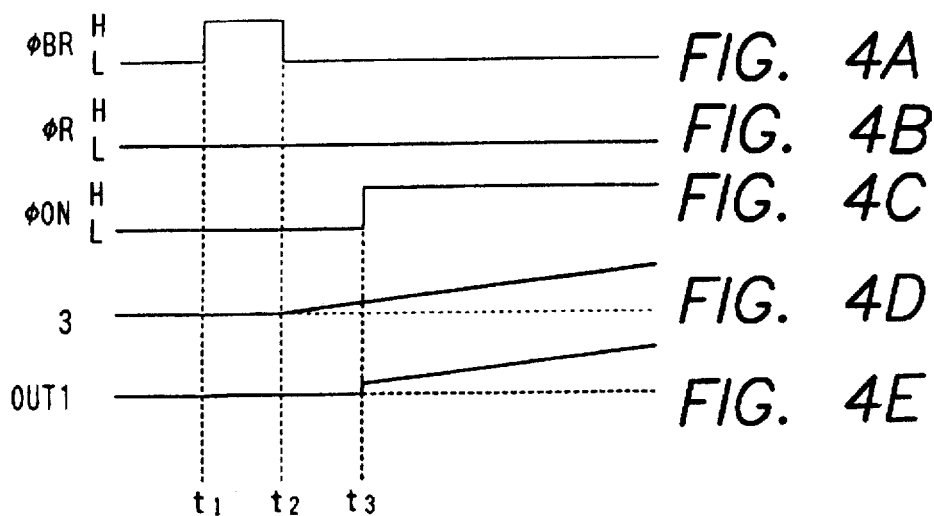
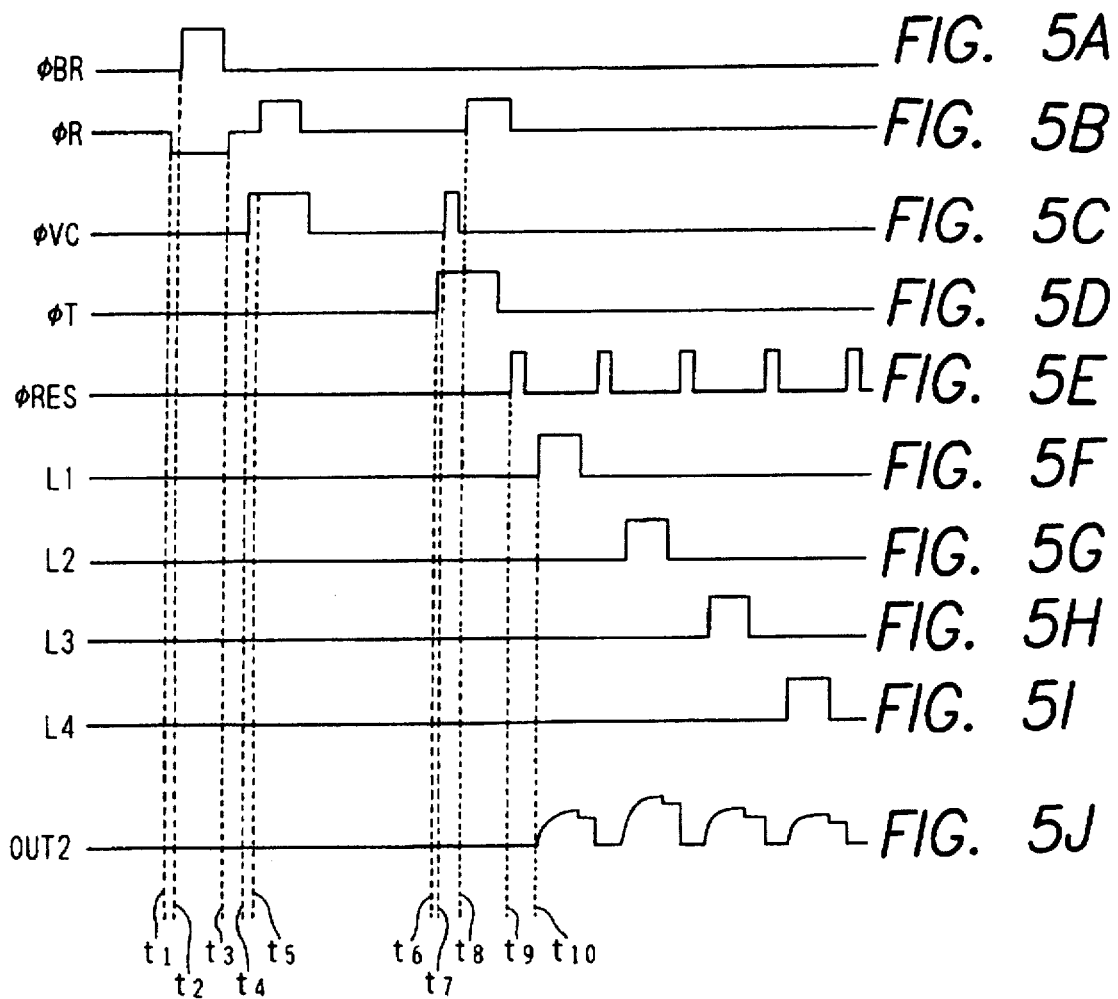

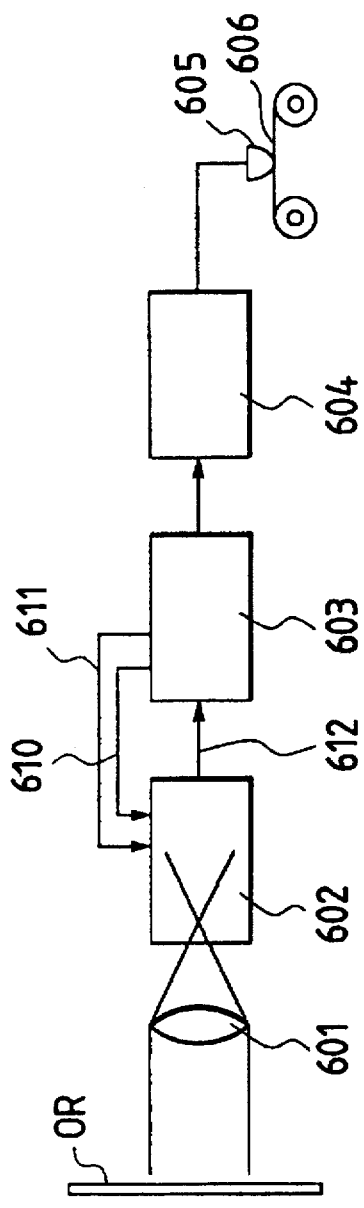
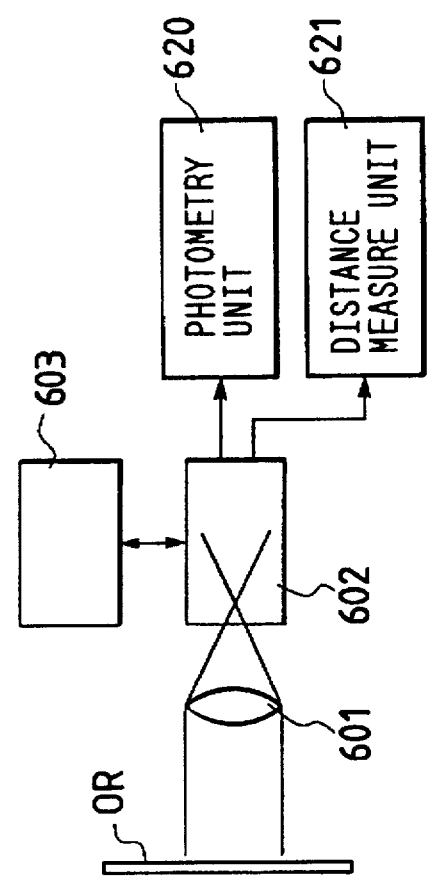
FIG. 13A
FIG. 13B

PHOTO-ELECTRIC CONVERTER WITH PARALLEL CONNECTION ELEMENTS AND DUAL SIGNAL READ OUT MEANS

This is a continuation of continuation-in-part of application Ser. No. 08/261,163 filed on Jun. 17, 1994.

BACKGROUND OF THE INVENTION

1. Field of the Invention

The present invention relates to a photoelectric converter such as an image sensor used in an image information processing apparatus such as a copying apparatus, facsimile apparatus or a video camera, or an AE/AF sensor of an automatic exposure and/or automatic focusing device of a camera.

2. Related Background Art

Recent advances in electronic technology have brought about attempts at designing higher performance products, including cameras, copying machines and facsimile machines.

For example, in a single reflex type camera, almost all products are presently equipped with the automatic exposure (AE) function and the automatic focusing (AF) function.

In the AE function, an absolute light intensity of an entire area in one frame corresponding to an image pickup area or one of divisional areas of one frame area is measured to automatically control the exposure or shutter speed. On the other hand, in the AF function, a distance to an object is calculated by a correlation function of an object pattern to automatically control lens position.

Thus, in order to enhance the precision, it is necessary to further subdivide the image pickup area.

Because the image pickup areas and the post-processing are different between the AE and the AF, it is necessary to use separate photo-electric converters (sensors). While various improvements have been made in the individual products to reduce the cost, a significant impact has not been achieved.

In the photometry sensor used for the AE function, when a light intensity of an entire area is to be detected, signals of respective areas are amplified by logarithmic amplifiers and output signals thereof are multiplexed.

In the distance measurement sensor used for the AF function, emitters of phototransistors for the respective photo-sensing areas are connected in, common and a peak signal is measured. It is difficult to measure an absolute light intensity of the entire photo-sensing area by this and so it is not used for the AE function.

A typical example of the photometry sensor is described in detail in U.S. Pat. No. 5,115,124 and a typical example of the distance measurement sensor is described in detail in U.S. Pat. No. 4,751,559.

In the former method, the signal processing in the succeeding stage and the drive of the decoder to multiplex the signals are complex, and the latter method is not suitable for the AE function.

SUMMARY OF THE INVENTION

It is an object for the present invention to provide a high performance photo-electric converter which permits to Vary the substantial area of the photo-sensing area with a simple construction.

The above object of the present invention is achieved, in accordance with an embodiment of the present invention, by a photo-electric converter comprising parallel connection means for connecting a plurality of photo-electric conversion elements and combined signal read means for reading a combined signal of the plurality of parallelly connected photo-electric conversion elements.

In accordance with the present invention, since the plurality of photo-electric conversion elements are connected in parallel, the individual photo-sensing areas may be connected in common to produce the combined signal for the entire photo-sensing area.

Other objects and features of the present invention will be apparent from the following description of the invention and the accompanying drawings.

BRIEF DESCRIPTION OF THE DRAWINGS

FIGS. 4A–4E show a timing chart for explaining an operation of the converter of the embodiment 1, FIG. 5A–5J show a timing chart for explaining an operation of the converter of the embodiment 1.

FIGS. 13A and 13B show block diagrams of an image information processing apparatus which uses the photo-electric converter of the present invention.

DETAILED DESCRIPTION OF THE PREFERRED EMBODIMENTS

Figure 1:
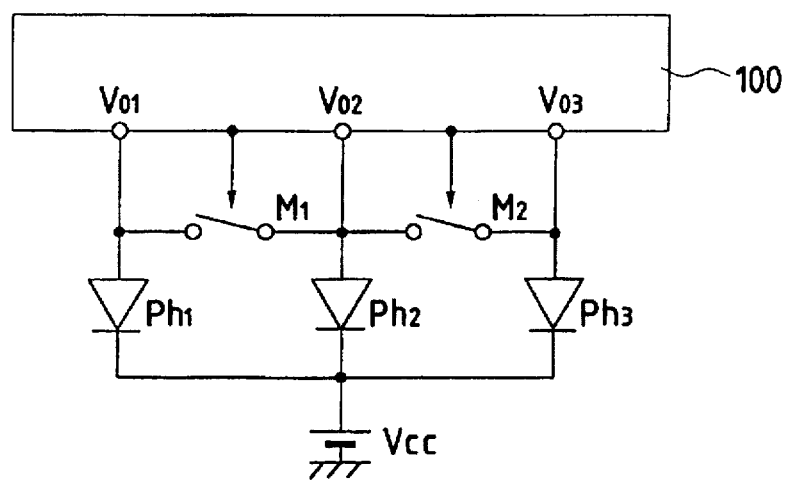
FIG. 1 shows a circuit diagram of a photo-electric converter in accordance with one embodiment of the present invention.

FIG. 1 shows a circuit diagram of a photo-electric converter (sensor) in accordance with one embodiment of the present invention, in which three photo-electric conversion elements are used.

$Ph_1, \ldots, Ph_3$ denote photo-electric conversion elements, $M_1$ and $M_2$ denote switching elements functioning as parallel connection means, $V_{CC}$ denotes a power supply, $V_{O1}, \ldots, V_{O3}$ denote output terminals, and 100 denotes read means. When the switching elements $M_1$ and $M_2$ are turned on by the read means, the three elements $Ph_1$, $Ph_2$ and $Ph_3$ are connected in parallel and a combined output is produced from an output terminal.

On the other hand, when an individual signal is to be derived from one of the elements $Ph_1, \ldots, Ph_3$, the switching elements $M_1$ and $M_2$ are turned off by the read means 100 so that the individual output may be read from the terminal $V_{o1}$, $V_{o2}$, or $V_{o3}$.

Figure 2A:
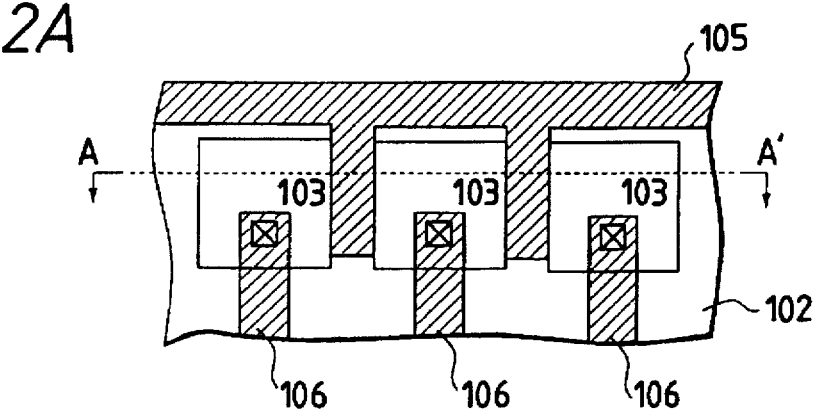
FIGS. 2A and 2B show diagrams for illustrating the photo-electric converter in accordance with the one embodiment of the present invention.
Figure 2B:
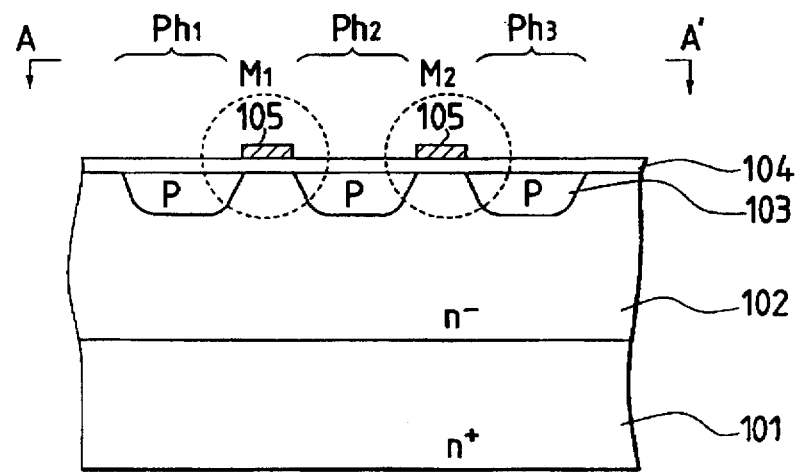

FIGS. 2A and 2B show diagrams of an example of the sensor described above. FIG. 2A shows a top view and FIG. 2B shows a sectional view taken along a line A—A'.

The photo-electric conversion elements $Ph_1, \ldots Ph_3$ are formed by photo-diodes each having a substrate 101, an $n^-$ layer 102 as a cathode and a p region 103 as an anode.

The switching elements $M_1$ and $M_2$ are formed by MOS transistors each having p regions 103 as a source and a drain, a gate insulation layer 104 and a gate electrode 105.

Numeral 106 denotes a terminal for reading out a signal and it is connected to the read means 100 (FIG. 1) together with the gate electrode 105.

When a low level pulse is applied to the gate electrode 105, the PMOS transistors $M_1$ and $M_2$ are turned on so that the photo-sensing areas (P areas) are connected in common.

On the other hand, when a high level pulse is applied to the gate electrode 105, the PMOS transistors $M_1$ and $M_2$ are turned off so that the individual photo-sensing areas are separate.

In the present sensor, the size of the photo-sensing area may be changed by the selective turning on/off of the PMOS transistors $M_1$ and $M_2$. When only the transistor $M_1$ is turned on, a combined signal (mixed signal) of the photo-diodes $Ph_1$ and $Ph_2$ is produced, and a single photo-diode output is produced from the photo-diode $Ph_3$. Similarly, when only the transistor $M_2$ is turned on, a combined signal of the photo-diodes $Ph_2$ and $Ph_3$ is produced.

The sensor of the present invention may be operated in the following operation sequence. First, the transistors $M_1$ and $M_2$ are turned on to produce the signal for the entire photo-sensing area. Then, the transistors $M_1$ and $M_2$ are turned off to produce the signals of the respective photo-diodes individually. In this manner, the combined signal and the individual signals may be produced.

It is preferable to reset (initialize) the photo-diodes immediately before the second read operation of the signals. The above operation nay be controlled by a drive circuit integrated on the same semiconductor substrate or an off-chip drive circuit.

The photo-electric conversion elements used in the present invention may include the photo-diodes described above as well as bipolar transistors, junction-type field effect transistors, gate insulated field effect transistors and static induction transistors.

The parallel connection means used in the present invention may include transistors and charge coupled devices (CCD's).

The read means used in the present invention may be those having resistive loads and those having capacitive load, and may include CCD registers, BBD registers, shift registers or multiplexors as. required to reduce the number of output terminals.

Specific embodiments of the present invention will now be explained in detail although the present invention is not limited to those specific embodiments but any forms which attain the object of the present invention may be used.

Figure 3:
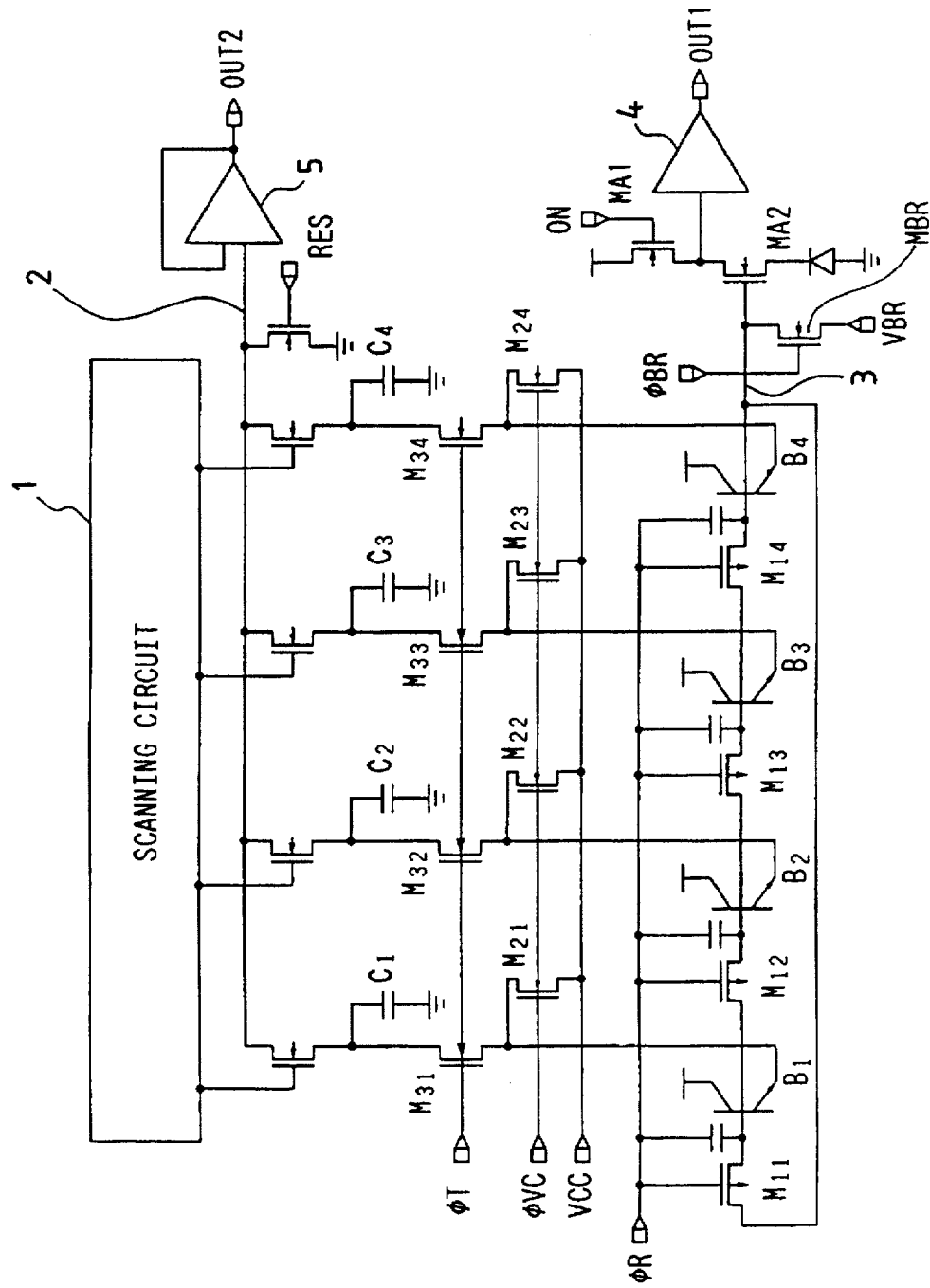
FIG. 3 shows a circuit diagram of an embodiment 1 of the present invention.

Referring to FIG. 3, a first embodiment of the present invention is explained. In the present embodiment, bipolar photo-electric conversion elements are one-dimensionally arranged as photo-electric conversion elements. Base regions of the respective elements are connected through PMOS transistors $M_{11}$–$M_{14}$. The parallel output read operation (read mode 1) in the present embodiment is now explained with reference to a timing chart of FIG. 4A–4E.

During the present operation, a low level voltage is applied to terminals $\phi_T$ and $\phi_{VC}$ so that emitter terminals of the bipolar transistors $B_1$–$B_4$ are floating. The low level voltage is applied to a terminal $\phi_R$, the PMOS transistors $M_{11}$–$M_{14}$ are turned on, and the base regions of the bipolar transistors $B_1$–$B_4$ are connected in parallel.

When the pulse at $\phi_{BR}$ is raised to a high level at a time $t_1$, the NMOS transistor $M_{BR}$ is turned on and the base regions of the bipolar transistors $B_1$–$B_4$ are reset to the reset voltage $V_{BR}$. When the pulse at $\phi_{BR}$ falls at a time $t_2$, the base regions of the bipolar transistors $B_1$–$B_4$ float while they are connected in common.

Accordingly, a light directed to the photo-electric converter is photo-electrically converted by the PN junctions formed between bases and collectors of the respective bipolar transistors and the generated electron-hole pairs are accumulated on the base regions so that the potential of the base line 3 of each bipolar transistor rises.

When a pulse $\phi_{ON}$ rises at a time $t_3$, an NMOS transistor MA1 is turned on so that a signal amplified by an NMOS transistor MA2 having the base line 3 connected to a gate thereof, and further by an output amplifier 4 is outputted at an output terminal OUT1.

By this operation, a light intensity directed to the entire photo-sensing area is determined, and based on this signal, the exposure may be determined by photometry means, not shown, to conduct the AE operation.

In the present embodiment, the photo-carriers are accumulated while the emitter terminals of the bipolar transistors are floating. Alternatively, the accumulation may be made while the high level voltage is applied to $\phi_{VC}$ to reversely bias the base-emitter junctions. In this case, the photo-electric conversion is also effected in the base-emitter junction areas so that the sensitivity is enhanced.

The signal read operation of the individual photo-electric conversion elements (read mode 2) is now explained with reference to a timing chart of FIGS. 5A–5J.

At the time $t_1$, the low level pulse is applied to $\phi_R$ to connect the bases of the bipolar transistors $B_{1-B4}$ in common and at the time $t_2$, $\phi_{BR}$ rises. The NMOS transistor $M_{BR}$ is turned on and the base regions are reset to the voltage $V_{BR}$. After the reset, the pulse at $\phi_R$ is at a middle level at a time $t_3$ so that the PMOS transistors $M_{11}$–$M_{14}$ are turned off and the individual photo-electric conversion elements are disconnected.

At a time $t_4$, the pulse at $\phi_{VC}$ rises and the NMOS transistors $M_{21}$–$M_{24}$ are turned on and the emitter terminals of the bipolar transistors $B_1$–$B_4$ are biased to $V_{VC}$. At a time $t_5$, the pulse at $\phi_R$ rises to the high level so that the base potentials of the bipolar transistors $B_1$–$B_4$ are raised through capacitors $C_1$–$C_4$ and the base-emitter junctions are forwardly biased. Thus, the bipolar transistors simultaneously operate in the emitter follower operation and the holes on the bases are recombined and the base potentials fall to $V_{VC}$+$V_{BE}$ (transitional reset). After the transitional reset, the pulse at $\phi_R$ falls to the middle level and the base potentials also fall through the capacitors $C_1$–$C_4$ so that the base-emitter junctions are reversely biased. Thereafter, the accumulation of the photo-carriers starts. After the elapse of a predetermined accumulation time, at a time $t_6$, the high level pulse is applied to $\phi_T$ so that the NMOS transistors $M_{31}$–$M_{34}$ are turned on. Subsequently at a time $t_7$, the high level pulse is applied to $\phi_{VC}$ so that the NMOS transistors $M_{21}$–$M_{24}$ are turned on and the emitter terminals of the bipolar transistors $B_1$–$B_4$ and the capacitors $C_{T1}$–$C_{T4}$ are reset to the voltage $V_{VC}$.

After the reset, the pulse at $\phi_{VC}$ falls so that the NMOS transistors $M_{21}$–$M_{24}$ are turned off and the emitter terminals of the bipolar transistors $B_1$–$B_4$ are floating. At a time $t_8$, the pulse at $\phi_R$ rises and the base potentials rise so that the base-emitter junctions are forwardly biased and the photo-carriers accumulated on the bases of the respective photo-electric converting elements are read into the capacitors $C_{T1}$–$C_{T4}$, respectively. Then, at a time $t_9$, the high level pulse is applied to $\phi_{RES}$ to turn on the NMOS transistor $M_{RS}$ so that the output line 2 is reset and the scan circuit is activated, and the signals are transferred, starting from the signal on $C_{T1}$, to the output terminal OUT2 through the output circuits. This output signal undergoes processing such as sample-hold processing and A/D conversion processing by an external circuit, and then correlation operation of each output is performed to be used in operations, for example, the AF operation in which the in-focus position is detected by the distance measurement means not shown. It should be understood that the respective bit signals may be used as one-dimension signals other than for AF operation.

Figure 6:
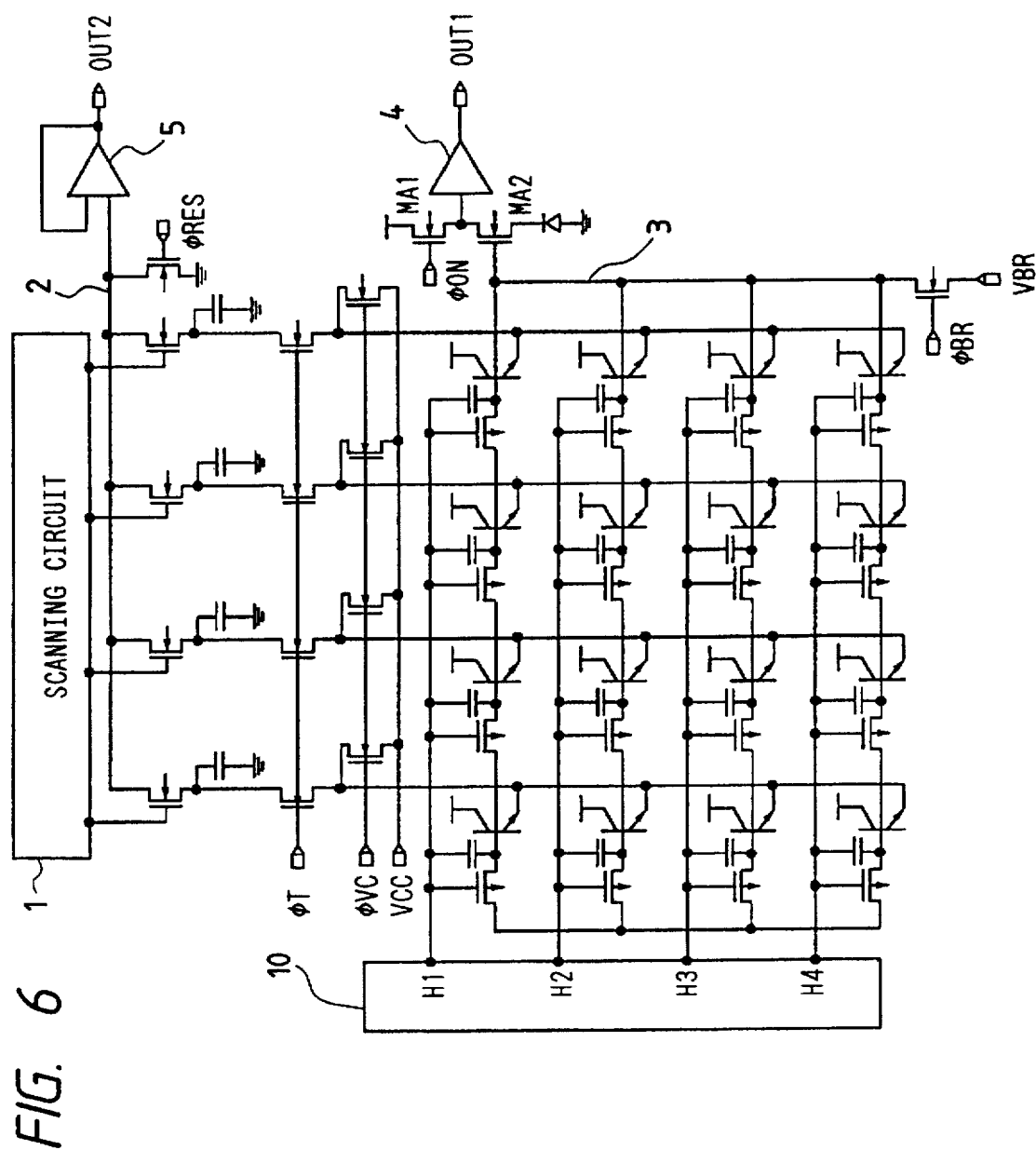
FIG. 6 shows a circuit diagram of a converter in accordance with an embodiment 2 of the present invention.

FIG. 6 shows a second embodiment of the present invention.

The second embodiment is an expansion of the first embodiment in which the photo-electric conversion elements are arranged in two-dimensions.

In the read mode 1, all of outputs H1–H4 of a vertical scan circuit 10 are rendered low level so that the photo-electric conversion elements are connected in parallel by row and the wirings thereof are connected in common by the line 3 and connected to the gate terminal of the NMOS transistor MA2. As a result, an average voltage of the base voltages of all pixels is produced on the line 3 and an amplified signal is produced at the output terminal OUT1.

In the read mode 2, a pulse corresponding to $\phi_R$ in the first embodiment is sequentially applied in the sequence of H1–H4 from the vertical scan circuit and the photo-signals of the respective pixels is time-serially outputted to the output terminal OUT2.

Figure 7:
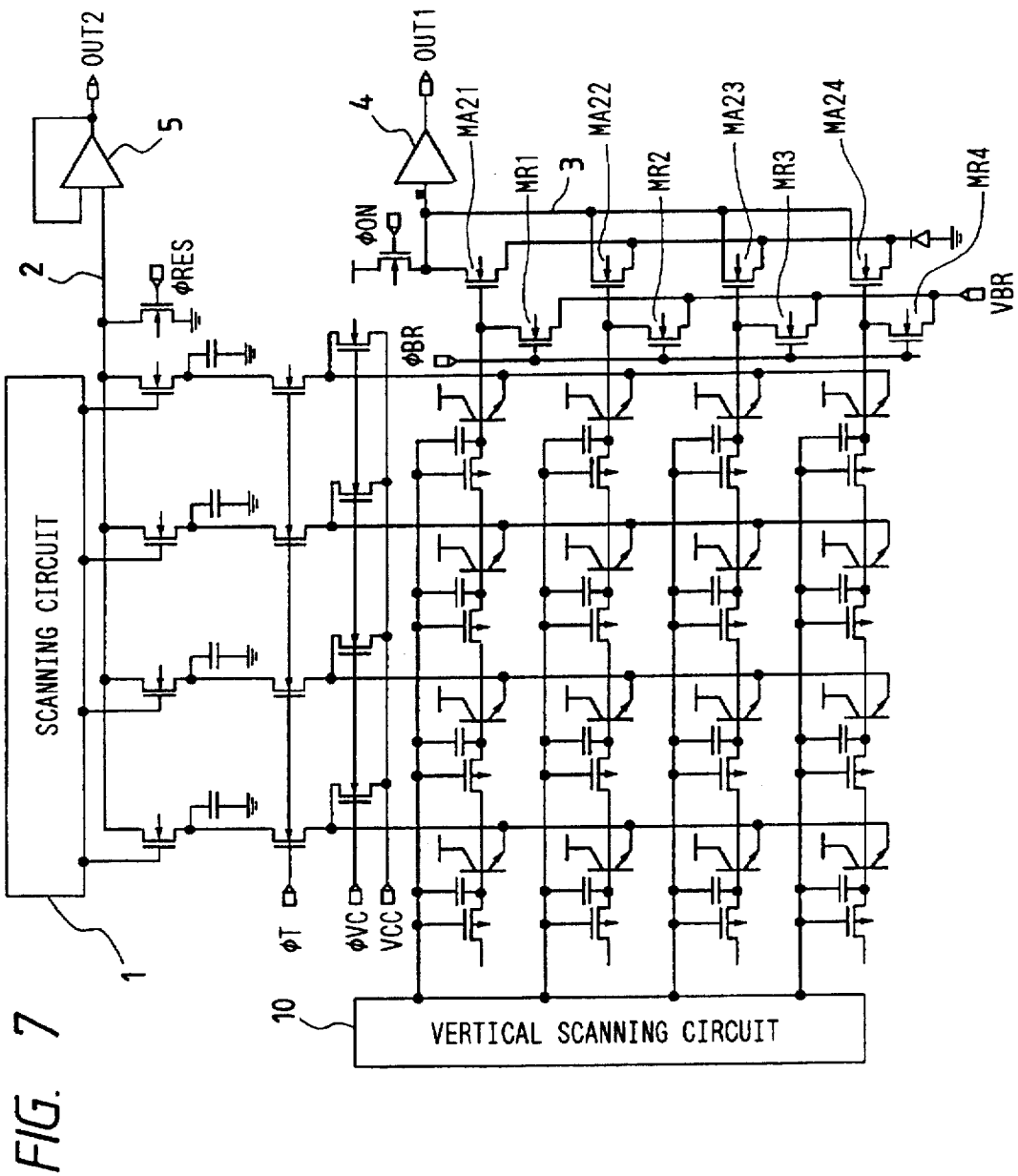
FIG. 7 shows a circuit diagram of an converter in accordance with an embodiment 3 of the present invention.

FIG. 7 shows a third embodiment of the present invention.

In third embodiment, compared to the second embodiment of FIG. 6, resetting NMOS transistors MR1–MR4 and amplifier input stage NMOS transistors MA21–MA24 are provided for the respective base lines of each row of the photo-electric conversion elements. This improves the detection sensitivity in the S: an area of light receiving region of one pixel read mode 1.

This will be briefly explained below by referencing an equivalent circuit of a unit photo-electric conversion element shown in FIG. 8.

Figure 8:
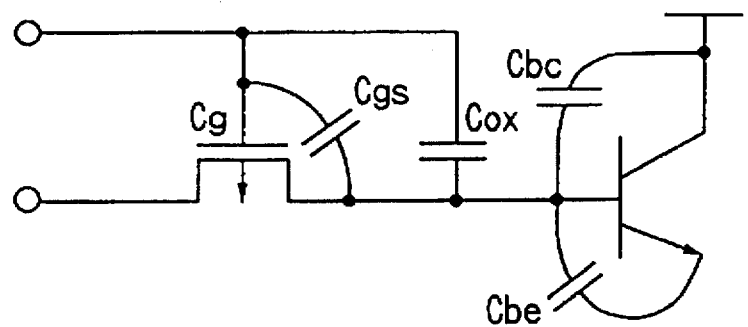
FIG. 8 shows an equivalent circuit of one photo-electric conversion element of the converter of the embodiment 3 of the present invention.

As shown in FIG. 8, connected to a base region of a bipolar transistor are; p1 $C_{ox}$ ... capacitance for resetting the photo-electric conversion element and reading a signal $C_g$ ... gate capacitance of a PMOS transistor as well as parasitic capacitances;

$C_{bc}$ ... base-collector junction capacitance, $C_{be}$ ... base-emitter junction capacitance, $C_{gs}$ ... gate overlap capacitance of the PMOS transistor A rise increment $\Delta V_B$ by the irradiation of light is given by;

$$\Delta V_B = (N \times N_{ph} \times \eta \times S \times q \times L \times t_c) / \{N \times (C_{ox} + C_g + C_{bc} + C_{be} + C_{gs})\} \quad (1)$$

where

N: number of photo-electric conversion elements connected in parallel $N_{ph}$: number of photons ($cm^{-2}$, $t^{-1}$, $w^{-1}$) per unit area, unit time, unit photo-energy $\eta$: quantum efficiency q: unit charge (C)

L: photo-energy (W)

$t_c$: accumulation time (sec)

Namely, the detection sensitivity ($\Delta V_B$) is independent from the number of photo-electric conversion elements connected.

Accordingly, in the third embodiment, the output $\Delta V_B$ of the elements connected in parallel for each row is output to the input gate of the amplifier comprising the NMOS transistors $M_{A1}$, $M_{A2i}$ (i=1–4) and the outputs thereof are connected in common and supplied to the amplifier 4 to enhance the detection sensitivity.

Figure 9:
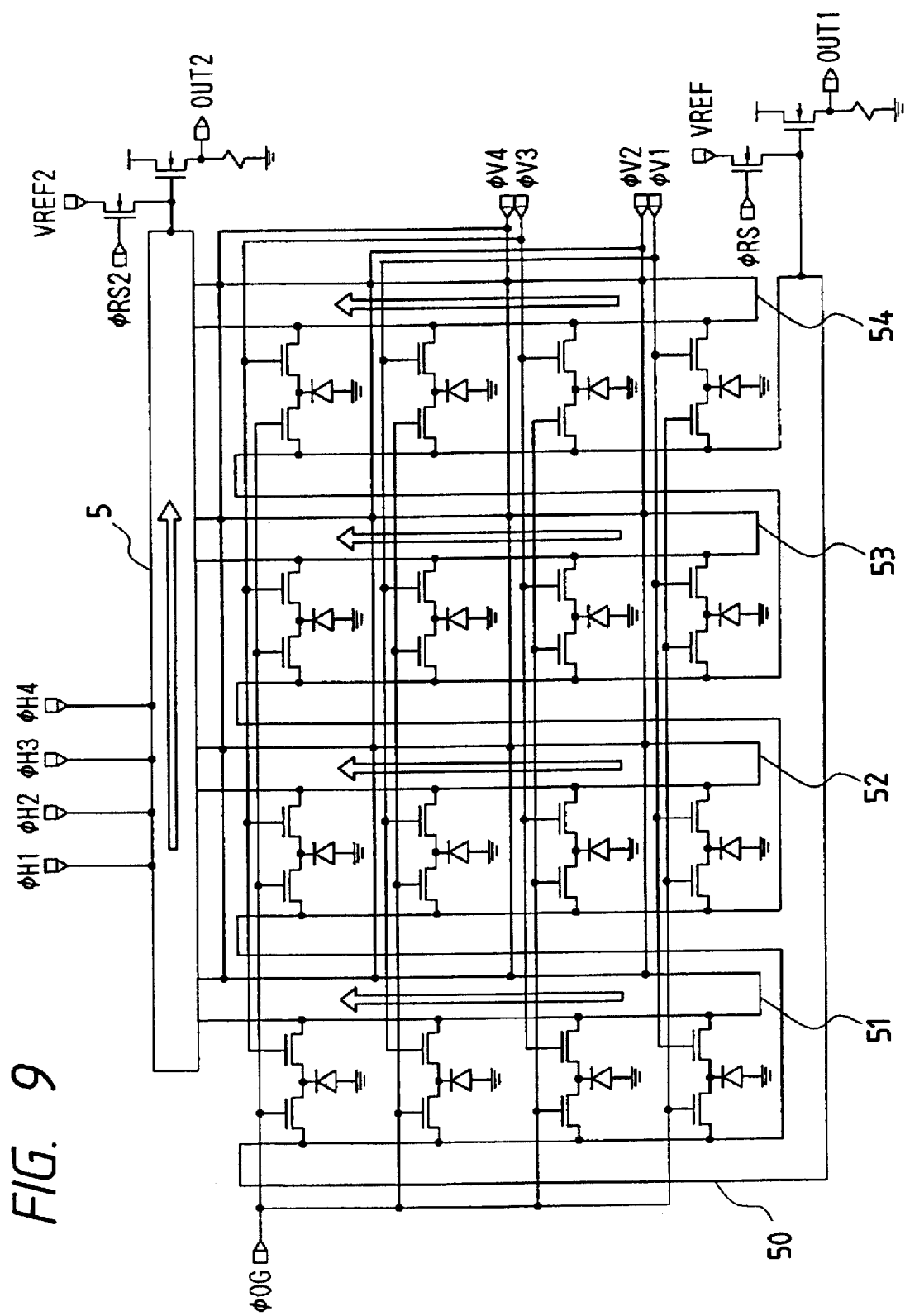
FIG. 9 shows a circuit diagram of a converter in accordance with an embodiment 4 of the present invention.

FIG. 9 shows a further embodiment of the present invention.

Signals photo-electrically converted by the photo-diode are transferred to vertical CCD's 51–54 through NMOS transistors and then outputted to a terminal OUT2 from an output amplifier by horizontal CCD's 5.

On the other hand, the respective photo-diodes are connected to a lateral overflow drain area 50 through the NMOS transistors and a potential thereof is outputted to a terminal OUT1 through the output amplifier.

Figure 10:
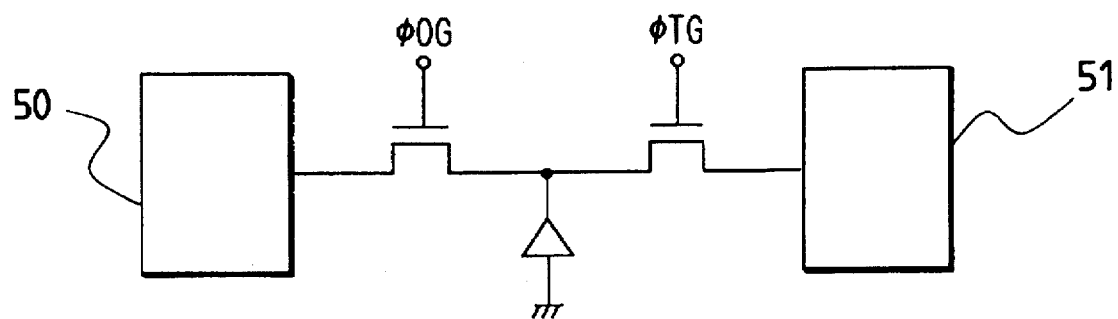
FIG. 10 shows a circuit diagram for explaining an operation of the converter of the embodiment 4.
Figure 11:
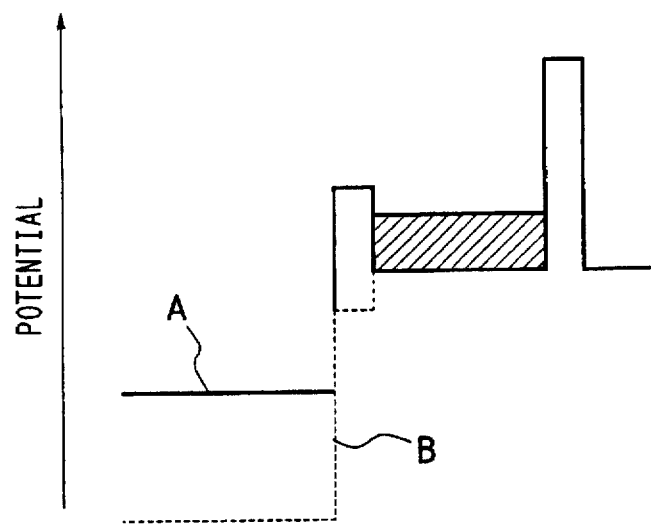
FIG. 11 shows a diagram for explaining an operation of the converter of the embodiment 4.

Referring to FIGS. 10 and 11, the drive in the read mode 1 is briefly explained.

FIG. 10 shows a circuit diagram of a unit photo-electric conversion element in which a photo-diode, NMOS transistors on the opposite sides thereof, and a vertical CCD 51 and a lateral overflow drain region 50 on the opposite side of the NMOS transistors are provided. In the read mode 1, when the potential at $\phi_{OG}$ is lowered to the potential indicated by dotted line B of FIG. 11, all of the signals generated in the photo-diode areas are transferred to the overflow drain region.

When the above operation is conducted in a plurality of photo-electric conversion elements, the photo-electric converted signals may be collected at the overflow drain region and it may be detected as a voltage from the terminal OUT1 through the output amplifier. In the fourth embodiment, the photo-diodes are substantially connected in parallel by the overflow drain region and the NMOS transistors.

In the read mode 2, the prior art CCD signal transfer system may be used as it is. By setting the potential at $\phi_{OG}$ to the potential indicated by solid line A in FIG. 11 so that the excess carriers in the photo-diodes flow into the overflow drain region without leaking into the vertical CCD's, the smear can be suppressed.

In the fourth embodiment, the lateral overflow drain region is used for the read mode 1. Instead, vertical CCD's may be provided.

Figure 12:
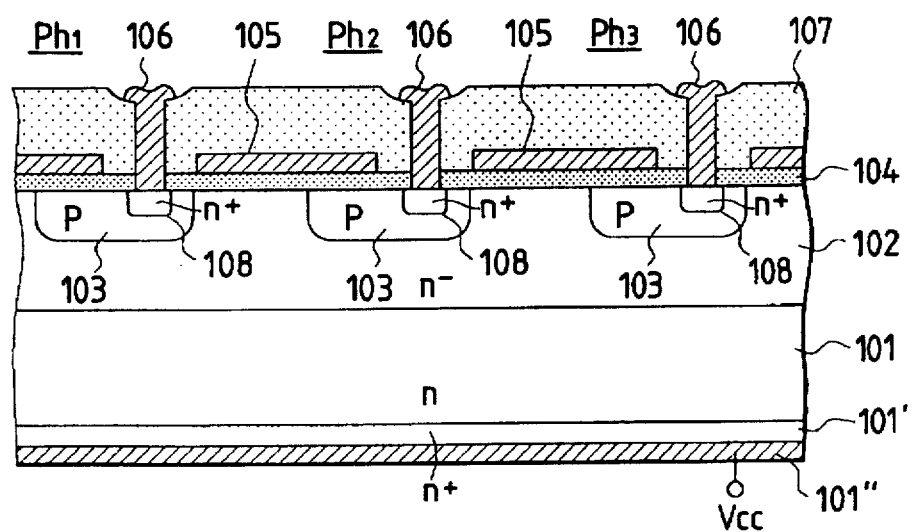
FIG. 12 shows a sectional view of an example of the photo-electric converter used in the present invention.

FIG. 12 shows a sectional view of a sensor when a bipolar transistor is used. Numeral 101 denotes an n substrate, numeral 102 denotes an n⁻ epitaxial layer, numeral 101' denotes an ohmic contact layer to a collector electrode 101", numeral 103 denotes a p base region, numeral 104 denotes an insulation film, numeral 105 denotes a gate electrode, numeral 106 denotes an emitter electrode which is an output terminal connected to an emitter region 108, and numeral 107 denotes an insulation film. By applying a high pulse, a middle pulse or a low pulse to the gate electrode 105, the PMOS transistor having a source and a drain formed by the base region 103 functioning as a switching element is turned on and off.

FIG. 13A shows a block diagram of a configuration of an information processing system such as a communication system, a facsimile apparatus, a video recorder, a copying apparatus or a scanner, which uses the photo-electric converter of the present invention.

OR denotes a document sheet bearing image information, numeral 601 denotes a focusing lens and numeral 602 denotes a photo-electric converter of the present invention.

The photo-electric converter may be a line sensor for the facsimile apparatus, and an area sensor for the video recorder.

Numeral 603 denotes a control circuit including a central processing unit and it is connected to the photo-electric converter 602 through an output line 610 for driving the photo-electric converter and a power supply line 611, and selects one of the two read modes.

Numeral 604 denotes a record control circuit which is connected to a recording head 605 to write information on a recording medium 606.

The recording head 605 may be a magnetic head for the video recorder and a thermal head or an ink jet head for the facsimile apparatus. The recording head 605 may be substituted by a recording unit located at a different site through a cable for the communication system.

The photo-electric conversion element of the present invention may be used in the photometry mode to determine whether a document sheet is placed on a document sheet table. Depending on the detection result (the presence or absence of the document sheet), the power supply is turned on or off to reduce overall power consumption.

Further, the read operation may be started after the detection of the document sheet.

In detecting the presence or absence of the document sheet, a weak LED light is flashed and directed to the document sheet, and if a signal is sensed by a sensor in the photometry mode in synchronism with the flashing the presence of the document sheet is detected. When the document sheet is not present, the signal is not produced by the sensor in the photometry mode and the absence of the document sheet is detected based thereon. It is preferable to apply an anti-reflection coating to a cover surface of the document sheet table to prevent the LED light from being reflected by the cover surface of the document sheet table which faces the document sheet and the reflected light from being directed to the sensor.

The present invention is suitably applicable to the information processing system described above. When it is applied to an image pickup apparatus such as a camera, the combined signal may be supplied to photometry means 620 as shown in FIG. 13B so that the exposure in picking up the image is determined and the diaphragm and shutter speed are determined based on the exposure. The individual signal may be applied to the distance measurement means 621 to detect the in-focus position. The photometry means and the distance measurement means are connected to the photo-electric converter and process the output signal therefrom. One of a mode to read the individual signal of each photo-electric conversion element and a mode to read a combined (mixed) signal of the plurality of photo-electric conversion elements is selected by a control circuit 603 to produce a desired signal.

In accordance with the present invention, the size of the photo-sensing area can be switched with a simple construction and a compact photo-electric converter with a high performance is provided at a low cost.

What is claimed is:

1. An image information processing apparatus comprising:

parallel connection means for connecting a plurality of photo-electric conversion elements in parallel;

signal read out means for reading out a signal formed by integrating signals of the plurality of photo-electric conversion elements which are connected in parallel;

individual signal read means for independently reading out a signal of each of the plurality of photo-electric conversion elements;

mode selecting means for selecting a light measurement mode, an image processing mode, and a reset mode; and control means for measuring brightness of an object based on an output of said signal read out means when said mode selecting means selects said light measuring mode, for processing an output of said individual signal read means when said mode selecting means selects said image processing mode and for resetting said plurality of photo-electric conversion elements by connecting said parallel connection means to a predetermined reset voltage.

2. An image pickup device comprising:

(a) a plurality of photoconversion elements each having a transistor to amplify a photoconversion signal, wherein said transistor includes a control electrode and a plurality of main electrodes;

(b) a shift register for sequentially reading out individual photoconversion signals from said plurality of photoconversion elements through respective one of said main electrodes to a sequential output line;

(c) a common connection line for selectively connecting a plurality of control electrodes of said transistors:

(d) reset means for resetting said plurality of photoconversion elements by connecting said common connection line to a predetermined voltage;

(e) a first output amplifier for sequentially amplifying said individual photoconversion signal read out through said sequential output line; and (f) a second output amplifier for deriving an output signal from said common connection line when said common connection line is not connected to said predetermined voltage.

3. An image pickup device according to claim 2, wherein said transistor includes a bipolar transistor.

4. An image pickup device according to claim 2, wherein said common connection line includes a plurality of switching elements for selectively connecting control electrodes of adjacent transistors.

5. An image pickup device according to claim 2, further comprising a process means for processing an output signal from said first output amplifier.

6. An image pickup device according to claim 5, wherein said processing means includes a distance measuring circuit for obtaining a distance information based on said output signal from said first output amplifier.

7. An image pickup device according to claim 2, further comprising a light metering circuit for metering brightness of an object based on an output signal from said second output amplifier.

8. An image pickup device comprising:

(a) a plurality of photoconversion elements;

(b) a first output means for sequentially reading out individual photoconversion signals from said plurality of photoconversion elements;

(c) a common connection line for selectively connecting said plurality of photoconversion elements;

(d) reset means for resetting said plurality of photoconversion elements by connecting said common connection line to a predetermined voltage;

(e) a second output means for deriving an output signal for said common connection line when said common connection line is not connected to said predetermined voltage.

9. An image pickup device according to claim 8, wherein each said photoconversion element includes a transistor for amplifying a photoconversion signal.

10. An image pickup device according to claim 9, wherein said transistor includes a bipolar transistor.

11. An image pickup device according to claim 10, wherein said common connection line includes a plurality of switching elements for selectively connecting control electrodes of adjacent transistors.

12. An image pickup device according to claim 8, further comprising a processing means for processing an output signal from said first output means.

13. An image pickup device according to claim 12, wherein said processing means includes a distance measuring circuit for obtaining distance information based on said output signal from said first output means.

14. An image pickup device according to claim 8, further comprising a light metering circuit for metering brightness of an object based on an output signal from said second output means.

* * * * *

UNITED STATES PATENT AND TRADEMARK OFFICE
CERTIFICATE OF CORRECTION

PATENT NO. : 5,663,555
DATED : September 2, 1997
INVENTOR(S) : Mamoru MIYAWAKI, et al.

It is certified that error appears in the above-identified patent and that said Letters Patent is hereby corrected as shown below:

Col. 1, line 5, change "continuation-in-part" to --continuation--.

Col. 1, line 6, after "1994" insert --now abandoned--.

Col. 1, line 39, change "achieve" to --achieved--.

Col. 1, line 46, change "in," to --in--.

Col. 1, line 48, after "this" insert --method--.

Col. 1, line 62, change "Vary" to --vary--.

Col. 3, line 24, change "transistors" to --transistor--.

Col. 3, line 39, change "nay" to --may--.

Col. 3, line 53, change "as." to --as--.

Col. 4, line 39, change "$B_1$-$B_4$" to --$B_1$-$B_4$--.

Col. 5, line 40, after "In" insert --the--.

Col. 5, line 51, delete "p1".

Signed and Sealed this

Twenty-ninth Day of June, 1999

Attest:

Attesting Officer

Q. TODD DICKINSON

Acting Commissioner of Patents and Trademarks